(12) United States Patent
Osowski et al.

(10) Patent No.: US 10,732,806 B2
(45) Date of Patent: Aug. 4, 2020

(54) INCORPORATING USER CONTENT WITHIN A COMMUNICATION SESSION INTERFACE

(71) Applicant: Google LLC, Mountain View, CA (US)

(72) Inventors: Maks Osowski, San Francisco, CA (US); Sanjay Gajanan Mavinkurve, Clyde Hill, WA (US); Greg Scott, Capitola, CA (US)

(73) Assignee: Google LLC, Mountain View, CA (US)

( * ) Notice: Subject to any disclaimer, the term of this patent is extended or adjusted under 35 U.S.C. 154(b) by 27 days.

(21) Appl. No.: 15/987,339

(22) Filed: May 23, 2018

(65) Prior Publication Data

US 2018/0267693 A1    Sep. 20, 2018

Related U.S. Application Data

(63) Continuation of application No. 14/830,663, filed on Aug. 19, 2015, now Pat. No. 10,007,410.

(51) Int. Cl.
| | | |
|---|---|---|
| *G06F 3/0484* | (2013.01) | |
| *H04N 7/14* | (2006.01) | |
| *G06F 3/0482* | (2013.01) | |

(52) U.S. Cl.
CPC ........ *G06F 3/04842* (2013.01); *G06F 3/0482* (2013.01); *H04N 7/141* (2013.01); *H04N 7/147* (2013.01)

(58) Field of Classification Search
CPC ... G06F 3/0482; G06F 3/04842; H04N 7/141; H04N 7/147
USPC ............................................ 348/14.01–14.16
See application file for complete search history.

(56) References Cited

U.S. PATENT DOCUMENTS

| | | |
|---|---|---|
| 6,879,997 B1 | 4/2005 | Ketola et al. |
| 7,392,296 B2 | 6/2008 | McIntyre et al. |
| 7,685,237 B1 | 3/2010 | Weaver et al. |
| 8,189,754 B2 | 5/2012 | Kuroda et al. |
| 8,612,211 B1 | 12/2013 | Shires et al. |
| 9,420,227 B1 | 8/2016 | Shires et al. |

(Continued)

FOREIGN PATENT DOCUMENTS

| | | |
|---|---|---|
| KR | 20020032844 A | 9/2002 |
| WO | 2014005222 A1 | 1/2014 |

OTHER PUBLICATIONS

Vanattenhoven, Jeroen et al., "Enriching Audio-Visual Chat with Conversation-Based Image Retrieval and Display", Proceedings of the 18th International Conference on Multimedia 2010, Oct. 25-29, 2010.

(Continued)

*Primary Examiner* — Hemant S Patel
(74) *Attorney, Agent, or Firm* — IP Spring (57) ABSTRACT

Systems and methods are disclosed for incorporating user content within a communication session interface. In one implementation, a processing device receives, in relation to a communication session between a first user and a second user, a communication input associated with a first user. The processing device processes the communication input to identify one or more content items stored on a content sharing platform that are associated with the first user and that pertain to one or more aspects of the communication input. The processing device modifies one or more aspects of an interface of the communication session based on the one or more content items.

20 Claims, 9 Drawing Sheets

(56) References Cited

U.S. PATENT DOCUMENTS

| | | | |
|---|---|---|---|
| 10,007,410 B2* | 6/2018 | Osowski | G06F 3/0482 |
| 2003/0097410 A1 | 5/2003 | Atkins et al. | |
| 2003/0162561 A1 | 8/2003 | Johnson et al. | |
| 2004/0024834 A1 | 2/2004 | Alegria et al. | |
| 2004/0044774 A1 | 3/2004 | Mangalik et al. | |
| 2006/0107303 A1 | 5/2006 | Erhart et al. | |
| 2007/0223668 A1 | 9/2007 | Blumenfeld et al. | |
| 2008/0181201 A1 | 7/2008 | Park et al. | |
| 2008/0240379 A1 | 10/2008 | Maislos et al. | |
| 2008/0275701 A1 | 11/2008 | Wu et al. | |
| 2009/0254840 A1 | 10/2009 | Churchill et al. | |
| 2012/0065969 A1 | 3/2012 | DeLuca et al. | |
| 2012/0092435 A1 | 4/2012 | Wohlert | |
| 2012/0150970 A1 | 6/2012 | Peterson et al. | |
| 2013/0013699 A1* | 1/2013 | Huxley | G06Q 10/101 |
| | | | 709/206 |
| 2013/0147904 A1 | 6/2013 | Vivekanandan et al. | |
| 2013/0194376 A1 | 8/2013 | Tseng et al. | |
| 2014/0108568 A1 | 4/2014 | Lee | |
| 2014/0310348 A1 | 10/2014 | Keskitalo et al. | |
| 2015/0029294 A1 | 1/2015 | Lin et al. | |
| 2015/0256793 A1 | 9/2015 | Pycock et al. | |

OTHER PUBLICATIONS

International Search Report and Written Opinion for PCT/US2016/046785, dated Nov. 11, 2016, 6 pages.

\* cited by examiner

INCORPORATING USER CONTENT WITHIN A COMMUNICATION SESSION INTERFACE

CROSS-REFERENCES TO RELATED APPLICATIONS

This application is a continuation of U.S. application Ser. No. 14/830,663, filed Aug. 19, 2015, which is incorporated herein by reference in its entirety.

TECHNICAL FIELD

Aspects and implementations of the present disclosure relate to data processing, and more specifically, to incorporating user content within a communication session interface.

BACKGROUND

Video communication over the Internet (e.g., videoconferences, telemedicine, etc.) is becoming increasingly common as broadband access and applications that take advantage of broadband connectivity proliferate. Applications for supporting video communication may be browser-based, or may run independently of a browser.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device receives, in relation to a communication session between a first user and a second user, a communication input associated with a first user. The processing device processes the communication input to identify one or more content items stored on a content sharing platform that are associated with the first user and that pertain to one or more aspects of the communication input. The processing device modifies one or more aspects of an interface of the communication session based on the one or more content items.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to incorporating user content within a communication session interface. The systems and methods disclosed can be applied to communication sessions (e.g., audio and/or videoconferences, audio and/or video chat, audio and/or videoconference rooms, audio and/or video chat rooms, etc.) in which content/media streams (e.g., live audio, video, and/or text content, etc.) are transmitted by devices of one or more participants/users to other participants/users. More particularly, though existing videoconference and communication technologies do enable participants to communicate and actively share content with one another, in many scenarios there exists content (as may be stored, for example, on a content sharing platform such as a social network) that may be relevant to or enhance such a communication session but which is not readily or easily available for retrieval by the participants (and thus remains ignored). Additionally, existing videoconference and communication technologies typically only enable a participant to view that which is captured by the camera of another participant, however such a viewer generally remains unaware of other contextual information that may not be reflected in the received video stream (e.g., where the user is located, the time of day, the weather, etc.).

Accordingly, described herein in various embodiments are technologies that enable incorporating user content within a communication session interface. For example, as described herein, during the course of a videoconference, various communication inputs (e.g., audio, video, and/or textual content provided by the participants in the communication session) can be processed in order to identify content items (e.g., media, images, etc.) that pertain to such inputs and/or to the referenced participants in the session. Additionally, various contextual characteristics/aspects (e.g., those reflecting the context in which a particular participant is currently present in) can be determined. Having identified the referenced content items and/or determined the referenced context, various aspects of the interface of the referenced communication session can be modified, such as in order to incorporate the identified content items/contextual characteristics, such as in a manner described herein. In doing so, pertinent content items and contextual information can be provided within the interface of the communication session in a manner that enhances the experiences of the participants (by providing contextually relevant information) while not interrupting the regular course of communication.

Figure 1:
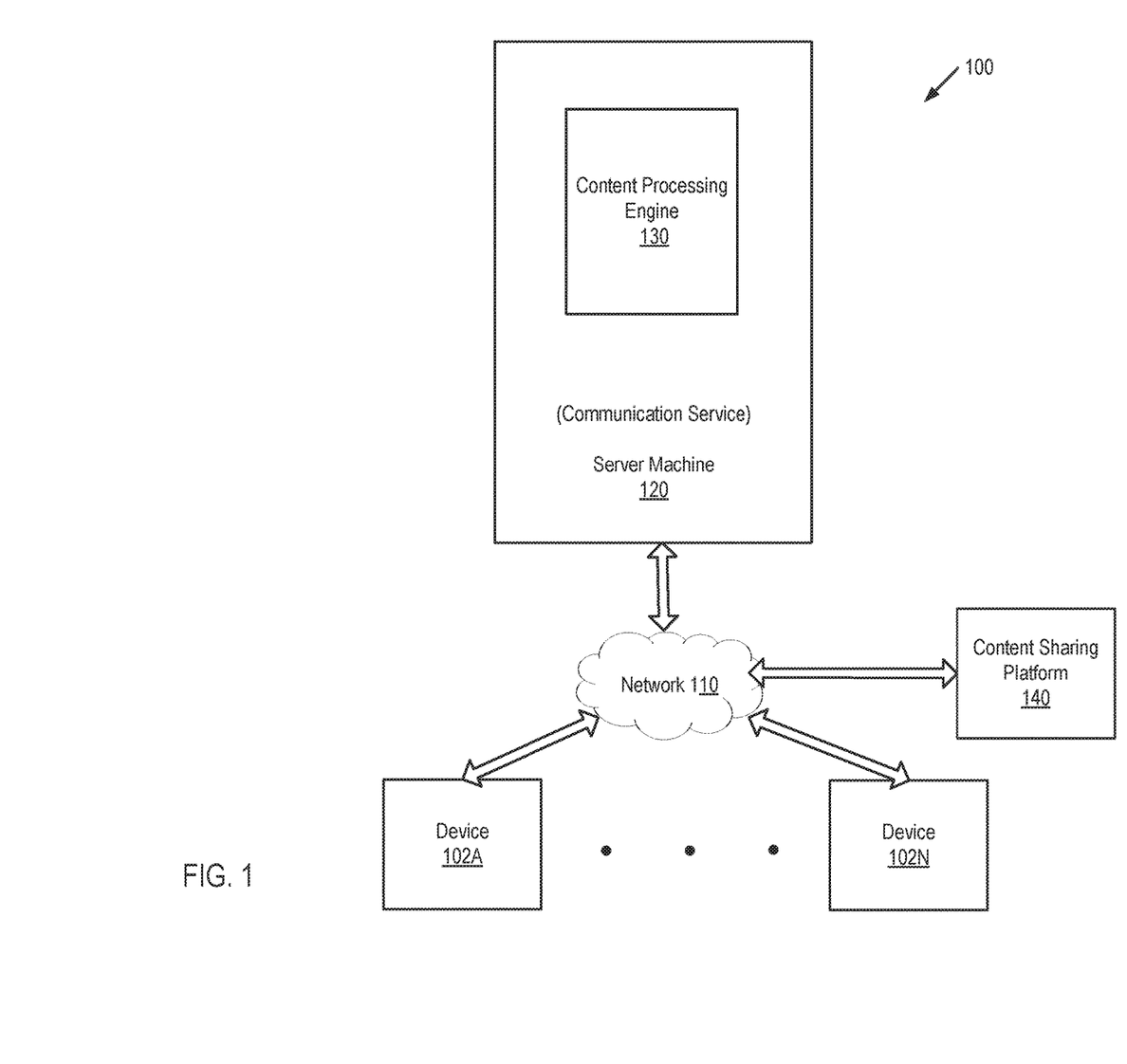
FIG. 1 depicts an illustrative system architecture, in accordance with one implementation of the present disclosure.

FIG. 1 depicts an illustrative system architecture 100, in accordance with one implementation of the present disclosure. The system architecture 100 includes user devices 102A-102N, server machine 120, and content sharing platform 140. These various elements or components can be connected to one another via network 110, which can be a public network (e.g., the Internet), a private network (e.g., a local area network (LAN) or wide area network (WAN)), or a combination thereof.

User devices 102A-102N can be wireless terminals (e.g., smartphones, etc.), personal computers (PC), laptops, tablet computers, smartwatches, smart devices, or any other computing or communication devices. The user devices 102A-102N may run an operating system (OS) that manages hardware and software of the user devices 102A-102N. Various applications, such as mobile applications ('apps'), web browsers, etc. (not shown) may run on the user devices (e.g., on the OS of the user devices). Such applications can, for example, enable a user to send/receive electronic messages, capture media content (e.g., an audio clip/stream, a video clip/stream, etc.), provide media content (e.g., upload media content or a content/media stream to a central server and/or transmit it to another user), receive media content/stream (e.g., via network 110), participate in a videoconference, and/or view, display, or otherwise present or consume media content (e.g., play a video/video stream, listen to a song/audio stream, etc.), such as via the user device 102. The user devices 102A-102N can be geographically distributed anywhere throughout the world.

Server machine 120 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. In certain implementations, server machine 120 can enable communication services such as audio and/or videoconferences (e.g., among the users of devices 102A-N) using, for example, streaming video or voice over IP (VoIP) technologies and may be used for personal, entertainment, business, educational or academically oriented interactions. Server machine 120 may be dedicated to providing video conferencing services or may provide video conferencing services along with other services including, for example, news services, social networking services and/or content hosting services. For instance, the server 120 may allow a user to view a video clip or a news article and start a videoconference while viewing the video clip or the news article. In another example, the server 120 may allow a user to start a videoconference while visiting a social networking site or video content hosting site.

Server machine 120 can also include components such as content processing engine 130. The components can be combined together or separated in further components, according to a particular implementation. It should be noted that in some implementations, various components of server machine 120 may run on separate machines. As described in detail herein, content processing engine 130 and/or server machine 120 can process various communication inputs (e.g., audio inputs, textual inputs, etc.) provided during the course of a communication session (e.g., a videoconference) in order to identify content items (e.g., images, videos, etc.) that may be stored at content sharing platform 140 (e.g., a social networking site/service) that may be relevant to the topic being discussed during the communication session, the participants in the session, etc. In doing so, such related/relevant content items can be identified and incorporated/integrated into the interface of the communication session, as described herein. Additionally, in certain implementations, upon identifying the referenced content items, such content items can be integrated/incorporated into the interface of the communication session in a manner that enables the participant(s) to perceive, view, etc., such related/relevant content while also enabling the ongoing communication session to continue without interruption or substantial distraction. Moreover, some operations of certain of the components, such as content processing engine 130, are described in more detail below with respect to FIGS. 2-8B.

Content sharing platform 140 can be one or more servers, computers, devices, etc., that provide a framework for social networking and/or any other such content sharing services, such as those that enable users to communicate and/or share information with one another. In certain implementations, each social network can provide a website and/or an application that enables users to utilize the functionality provided by the social network. Moreover, in certain implementations various social networks can enable users to share or otherwise disseminate media content items to other users, such as by providing one or more links to such media content items within posts, pages, and/or any other such interfaces provided by the social network, and/or by embedding such media content items within such posts, pages, and/or interfaces. Moreover, in certain implementations content sharing platform 140 can be a remote storage service, such as a service that enables users to store and retrieve media, files, etc. Additionally, in certain implementations content sharing platform can be one or more other services that store and/or provide information, including but not limited to weather information (e.g., with respect to a particular location).

It should be understood that though FIG. 1 depicts server machine(s) 120, device(s) 102, and platform 140 as being discrete components, in various implementations any number of such components (and/or elements/functions thereof) can be combined, such as within a single component/system. For example, in certain implementations server machine 120 and content sharing platform 140 can be integrated with one another (e.g., as part of a single platform). In other implementations, content sharing platform 140 can be a separate/independent platform (e.g., a third-party platform) which can communicate and/or otherwise interface with other service(s)/device(s), such as in a manner described herein.

In situations in which the systems discussed here collect personal information about users, or may make use of personal information, the users may be provided with an opportunity to control whether any of these systems collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the server 120, the content sharing platform 140, the user devices 102-102N, and/or any other component of the system 100.

Figure 2:
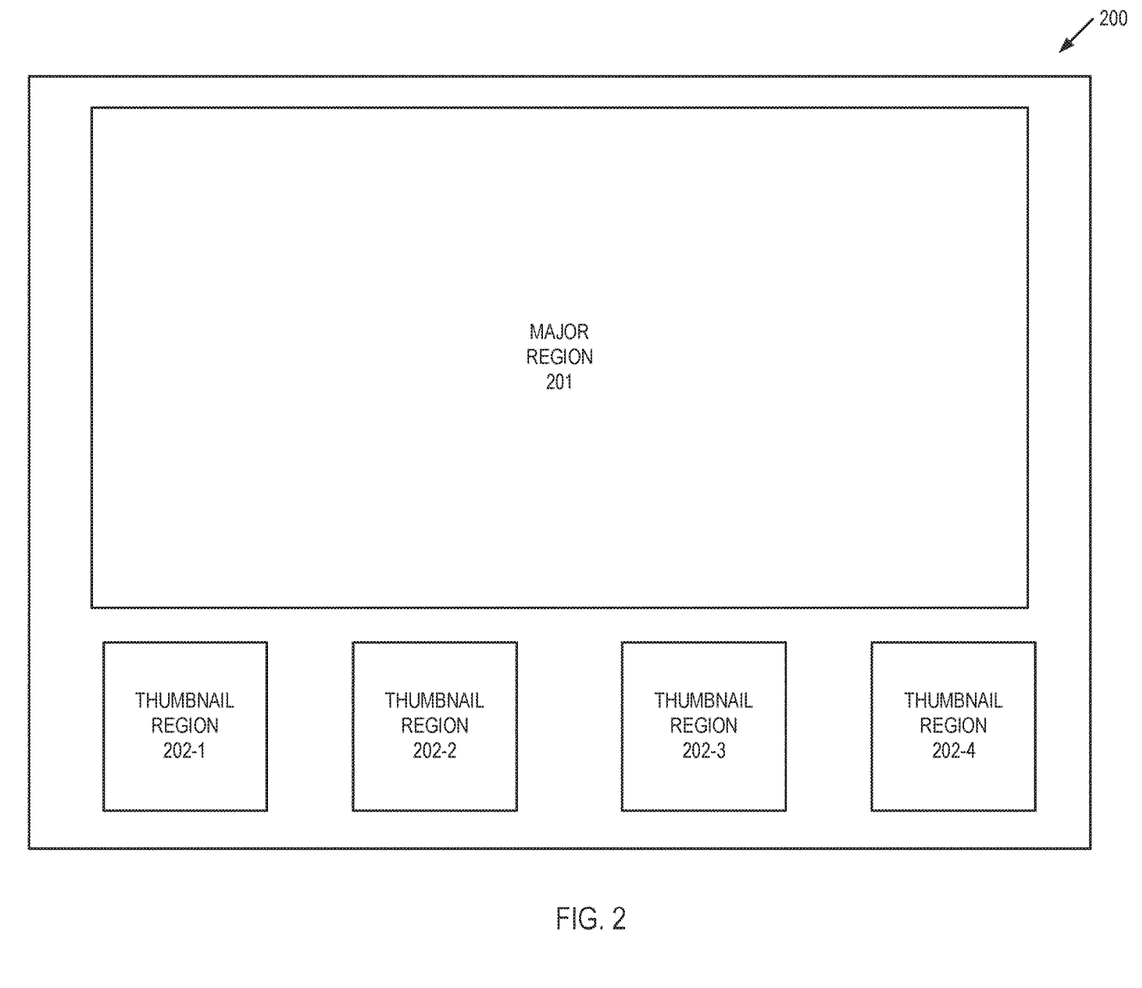
FIG. 2 depicts an exemplary interface of a communication service/application in accordance with one implementation of the present disclosure.

FIG. 2 depicts an illustrative screen/interface 200 of a composite audio/video stream associated with audio/video communication (e.g., a videoconference), such as may be generated/provided by server machine 120 to one or more user devices 102, in accordance with one implementation of the present disclosure. As shown in FIG. 2, screen 200 comprises one major region 201 and four thumbnail regions 202-1 through 202-4, where each of the referenced regions is associated with a respective participant/user. In certain implementations, each region can contain, depict, or otherwise present media content (e.g., video content) provided by a particular participant in a communication session. Thus, for example, the major region 201 may contain a video stream transmitted by a first participant, (e.g., a "room" of the first or primary participants in a videoconference, video clips shared by the first participant, etc.), while each of the thumbnail regions may contain a miniaturized version of a video stream transmitted by another participant, or simply a static image (e.g., an avatar, etc.) associated with the participant or video stream. In one implementation, a thumbnail region may transform or transition into a major region (e.g., in response to a participant selecting/clicking on the thumbnail region or otherwise activating the thumbnail region), and vice versa. It should be noted that although the regions of screen 200 are depicted as rectangular, one or more of the regions may have some other shape (e.g., a circle, a trapezoid, etc.). Moreover, in certain implementations a particular region can change (e.g., from a thumbnail region to a major region) depending on whether the participant associated with the region is speaking or not. Such a change can be done automatically (e.g., without receiving any user request or detecting any user interaction).

Moreover, one or more participants in an audio/video (audio and/or video) communication session can provide/project audio content (e.g., the spoken voice of the participant, music, etc.) which, upon being received/perceived by a user device, can be transmitted or otherwise provided by the user device as an audio stream (not shown) that can be incorporated into an audio/video communication session. In certain implementations, such audio streams can be provided independent of a video stream (e.g., a participant providing audio-only input during an audio/video communication session), while in other implementations such audio streams can be provided in conjunction with a video stream (e.g., a combined stream, incorporating synchronized video and audio of a participant talking).

In accordance with one implementation, server machine 120 combines the individual audio and/or video streams into a composite stream and embeds metadata within the composite stream that specifies geometric properties of the regions corresponding to the video streams as well as a region/participant mapping (an association between a user/participant and a region).

As described herein, multiple content streams (e.g., video streams) can be received by server machine 120 from various user devices 102, and a composite content/media stream can be generated and provided to the various participants in a communication session (e.g., a videoconference). Such a composite content/media stream can arrange the various content streams in different presented regions, such that a user/participant in the videoconference can simultaneously view some or all of the content streams within a single interface/screen. During the course of such a videoconference, various communication inputs (e.g., audio inputs, textual inputs, etc.) can be processed in order to identify content items (e.g., images, videos, etc.) that may be stored at content sharing platform 140 (e.g., a social networking site/service) that may be relevant to the topic being discussed during the videoconference, the participants in the videoconference, etc. In doing so, such related/relevant content items can be identified and incorporated/integrated into the interface of the videoconference, as described herein. Additionally, in certain implementations, upon identifying the referenced content items, such content items can be integrated/incorporated into the interface of the videoconference in a manner that enables the participant(s) to perceive, view, etc., such related/relevant content while also enabling the ongoing videoconference to continue without interruption or substantial distraction. In certain implementations, such operations can be performed by and/or in conjunction with content processing engine 130.

Figure 3:
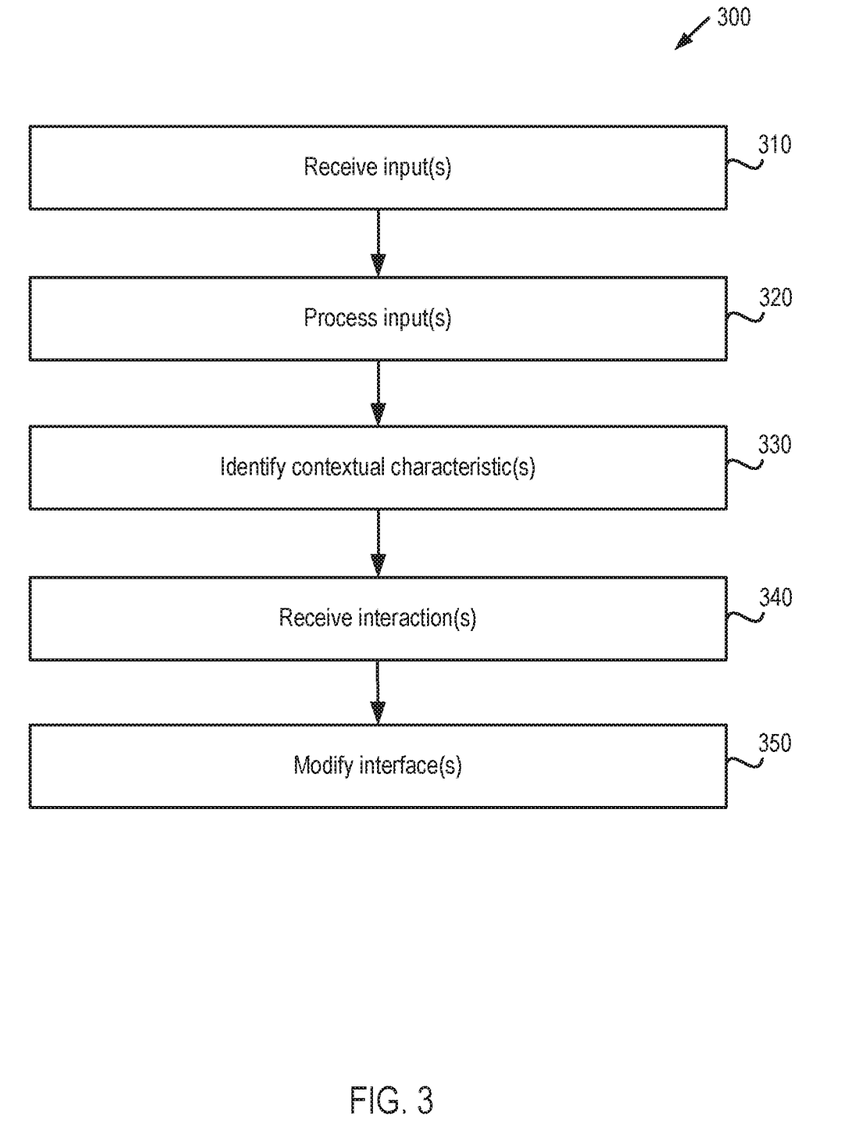
FIG. 3 depicts a flow diagram of aspects of a method for incorporating user content within a communication session interface.

FIG. 3 depicts a flow diagram of aspects of a method 300 for incorporating user content within a communication session interface. The method is performed by processing logic that may comprise hardware (circuitry, dedicated logic, etc.), software (such as is run on a general purpose computer system or a dedicated machine), or a combination of both. In one implementation, the method is performed by server machine 120 of FIG. 1, while in some other implementations one or more blocks of FIG. 3 may be performed by another machine. For example, in various alternative implementations, the method can be performed by/at user device(s) 102.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 4A:
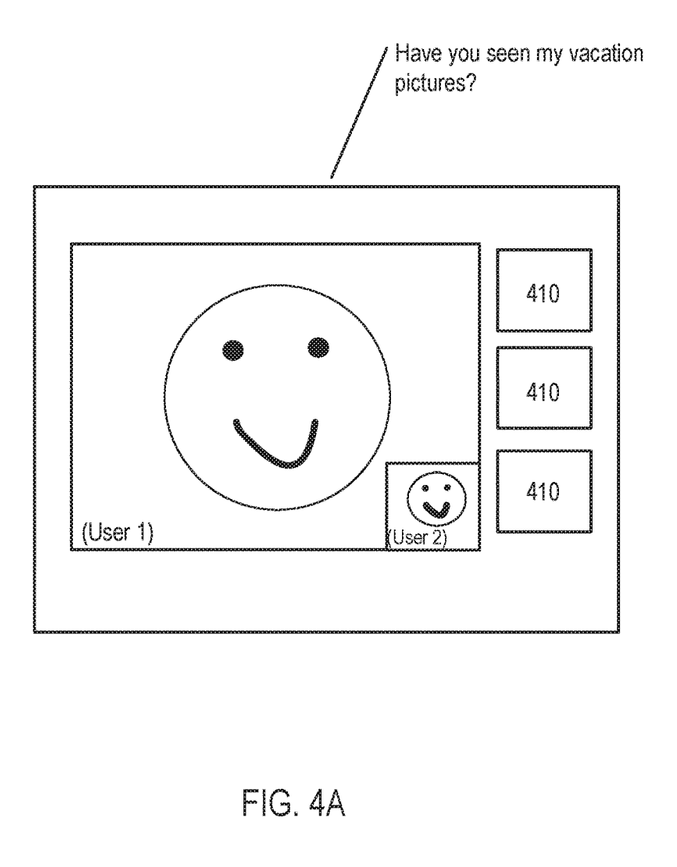
FIG. 4A depicts an exemplary communication session interface, in accordance with one implementation of the present disclosure.

At block 310, a communication input can be received. In certain implementations, such a communication input can be associated with a first user. Moreover, in certain implementations such a communication input can be received in relation to a communication session between a first user and a second user (e.g., a chat session, a videoconference, etc.). Additionally, in certain implementations such a communication input can include textual, video, and/or graphical content. By way of illustration, one user may conduct a communication session with one or more other users, such as by providing various inputs (e.g., audio and/or video content as captured by device 102, such as during an audio/video conference and/or textual or graphical content, such as during a 'chat' session) which are shared with the participants in the communication session. Examples of such communication inputs are depicted in FIG. 4A (showing an audio/video input) and FIG. 4B (showing textual/chat inputs) and described in greater detail herein. In one aspect, block 310 is performed by content processing engine 130.

At block 320, a communication input (such as the communication input received at 310) can be processed. In doing so, one or more content items can be identified. For example, content item(s) (e.g., images, audio, video, content pages, files, and/or any other such media, data, and/or content) associated with a first user (e.g., the user associated with the communication input) can be identified. Moreover, in certain implementations, content items that pertain to one or more aspects of the communication input (such as the communication input received at 310) can be identified. By way of illustration, textual inputs (e.g., those provided by the user, such as in a 'chat' message) and/or audio inputs (e.g., those spoken/provided by the user, such as during an audio and/or video conference) can be processed (e.g., using language processing techniques) and various content items (e.g., those stored on content sharing platform 140, e.g., a social networking and/or any other such content storage/delivery service) that are associated with the content of the communications provided by the referenced user (e.g., photos/images created, provided, and/or otherwise associated by/with the user) and that pertain to the referenced input(s) can be identified. In one aspect, block 320 is performed by content processing engine 130.

By way of illustration, FIG. 4A depicts an exemplary interface of a videoconferencing service/application. As shown in FIG. 4A and described herein, various content items (410), such as those associated with a user (e.g., 'User 1') and/or a communication input (e.g., audio of the user saying 'have you seen my vacation pictures?') can be identified (e.g., based on a processing of the communication input). For example, as shown in FIG. 4A, content items 410, such as images, videos, and/or other media content (which can be stored at content sharing platform 140, e.g., a social networking site/service, such as in relation to an account associated with the user) can be identified based on their associated with a participant in the communication session (e.g., 'User 1') and/or based on their association with/relevance to the content of various communication inputs provided by the user (e.g., audio of the user saying 'have you seen my vacation pictures?'). In doing so, those content items that may be relevant/related to a communication session (e.g., to a topic being discussed by the participants in the session) can be identified. It should be understood that such content items can be identified even in scenarios in which the referenced participant(s) may not have immediate and/or direct access to the content items (e.g., in a scenario in which such content items are stored on a content sharing platform such as a social media service). In lieu of a participant recalling the existence of such content items and then searching for or browsing another platform (e.g., a social network) in order to retrieve them and incorporate them into the referenced communication session, the described technologies can enable the identification of such related/relevant content items and the incorporation/integration of such content into the interface of the communication session. In doing so, such content items can be retrieved and incorporated in a manner that does not interrupt the participants from continuing the communication session. Additionally, in certain implementations, upon identifying the referenced content items, such content items can be integrated/incorporated into the interface of the communication session in a manner that enables the participant(s) to perceive, view, etc., such related/relevant content while also enabling the ongoing communication session to continue without interruption or substantial distraction.

Additionally, in certain implementations content items that are associated with a first user (e.g., the user from which the communication input originated) and a second user (e.g., a user to whom the communication input is directed) and that pertain to one or more aspects of the communication input can be identified. By way of illustration, textual inputs (e.g., those provided by the user(s)) and/or audio inputs (e.g., those provided by the user(s)) can be processed (e.g., using language processing techniques) and various content items (e.g., those stored on content sharing platform 140, e.g., a social networking service) that are associated with the content of the communications provided by the referenced user(s) (e.g., photos/images created, provided, and/or otherwise associated by/with the user) and that are associated with both users can be identified. As noted, such content items (e.g., images, video, or other media content) can be content items that are relevant/related to the referenced communication session (e.g., to a topic being discussed by the participants in the session) and such content items can be identified even in scenarios in which the referenced participant(s) may not have immediate and/or direct access to the content items. In lieu of a participant manually retrieving such content from another platform (e.g., a social network, such as content sharing platform 140), the described technologies can identify such related/relevant content items and incorporate/integrate them into the interface of the communication session in a manner that does not interrupt the participants from continuing the communication session.

Figure 4B:
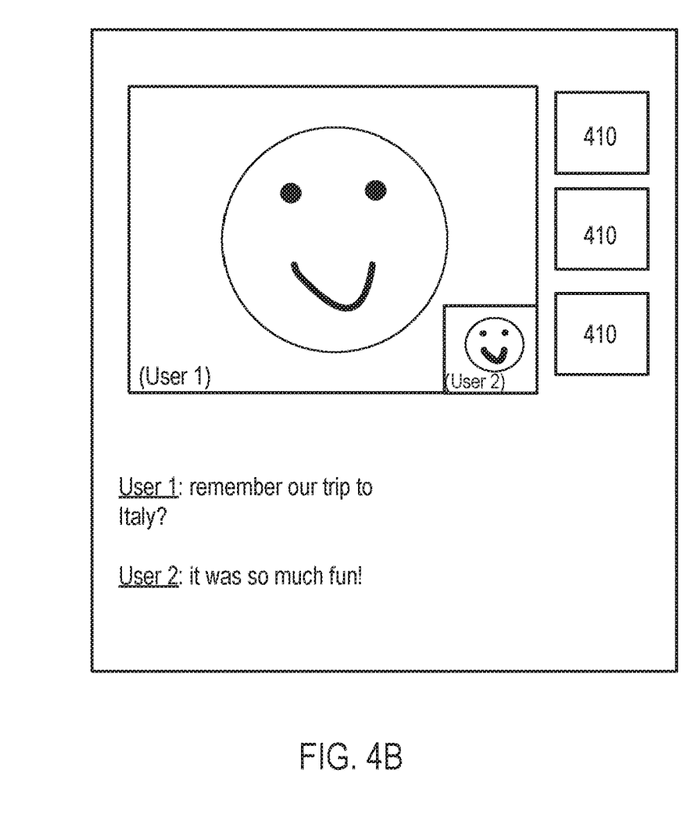
FIG. 4B depicts an exemplary communication session interface, in accordance with one implementation of the present disclosure.

By way of illustration, FIG. 4B depicts an exemplary interface of a videoconferencing service/application. As shown in FIG. 4B and described herein, various content items (410), such as those associated with multiple participants in a communication session (e.g., 'User 1' and 'User 2') as well as communication input(s) provided during such a session (e.g., audio and/or text such as 'remember our trip to Italy?') can be identified. For example, as shown in FIG. 4B, content items 410 (which can be stored at content sharing platform 140, e.g., a social networking site/service) can be identified based on their association with a participants in the communication session (e.g., 'User 1' and 'User 2,' such as in a scenario in which both users are 'tagged' or otherwise associated with a content item) as well as based on their association with/relevance to the content of various communication inputs provided by the user(s) (e.g., pictures and/or other content pertaining to a trip to Italy, as determined, for example, based on metadata associated with the content which can reflect a geographic location at which the content was captured, a description or category associated with the content, etc.).

At block 330, various contextual characteristics can be identified. In certain implementations, such contextual characteristics can be associated with a user (e.g., the user associated with the communication input). Examples of such contextual characteristics can include a location at which a user is present, the current weather at a location associated with a user, an occasion (e.g., birthday) associated with a user, an event associated with a user's calendar, a topic of the conversation, user profile information associated with a user, one or more interests associated with a user, one or more media content items associated with a user (e.g., photos albums), etc. In one aspect, block 330 is performed by content processing engine 130.

Figure 5A:
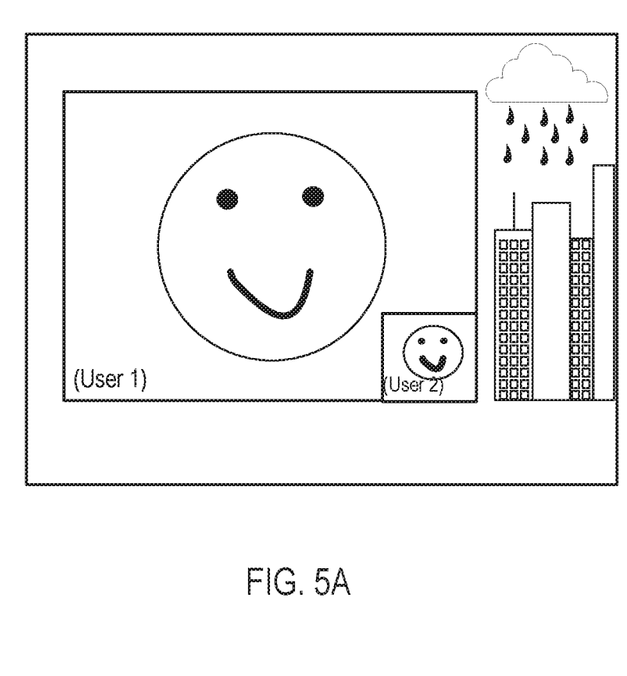
FIG. 5A depicts an exemplary communication session interface, in accordance with one implementation of the present disclosure.

By way of illustration, FIG. 5A depicts an exemplary interface of a videoconferencing service/application. As shown in FIG. 5A and described herein, the referenced interface (which may otherwise not incorporate external content or annotations) can be modified, adjusted, annotated, etc. based on the referenced contextual characteristics (e.g., location, weather, etc.), such as those associated with a participant in a communication session. For example, as shown in FIG. 5A, tall buildings/a skyline of a city at which a user is present can be incorporated into the interface (e.g., as a 'wallpaper' or background of the interface, as is depicted in FIG. 5A), as well as a cloud/rain graphic, depicting that it is currently raining in the referenced location. In doing so, the interface of the communication session can be modified to reflect aspects of the referenced contextual characteristics in a manner that enables the participant(s) to perceive, view, etc., such contextual characteristics while also enabling the ongoing communication session to continue without interruption or substantial distraction.

Figure 7A:
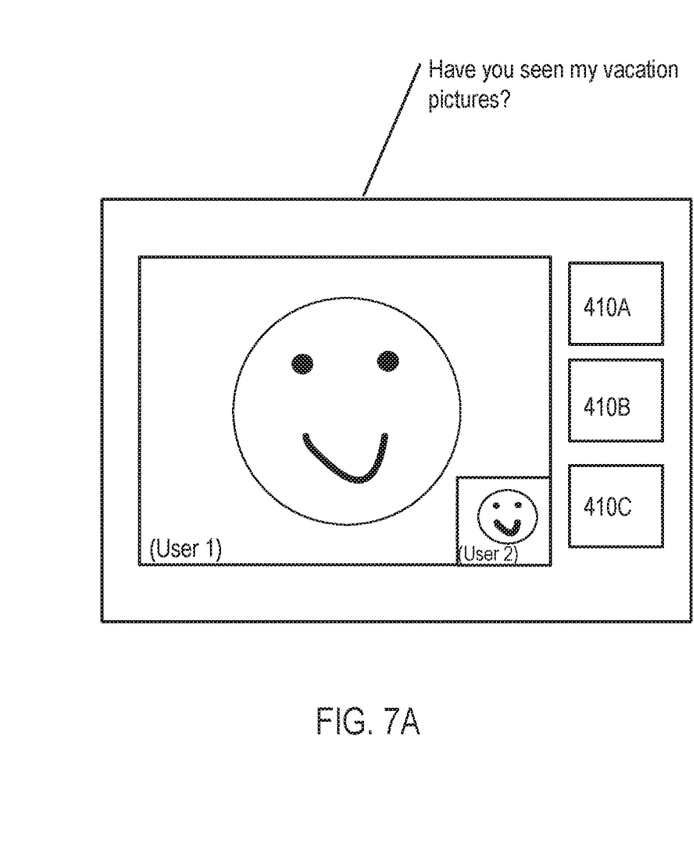
FIG. 7A depicts an exemplary communication session interface, in accordance with one implementation of the present disclosure.
Figure 7B:
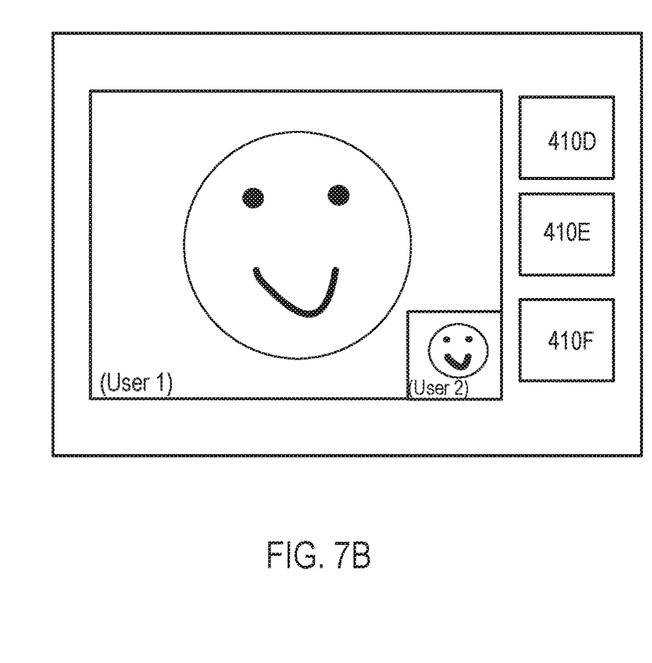
FIG. 7B depicts an exemplary communication session interface, in accordance with one implementation of the present disclosure.

At block 340, an interaction can be received. In certain implementations, such an interaction can be received in relation to an interface of the communication session. Moreover, in certain implementations such an interaction can be associated with the second user (e.g., a user to whom a communication input from a first user is directed). By way of illustration, FIG. 7A depicts an exemplary interface of a videoconferencing service/application. As shown in FIG. 7A and described herein, the referenced interface can be modified by identifying and providing various content items 410A-C, which can, for example, pertain to a communication input provided during the communication session (e.g., 'have you seen my vacation pictures') and a participant in the communication session (e.g., 'User 1'). Upon receiving one or more interactions in relation to the referenced interface (e.g., as initiated by 'User 2'), the referenced interface can be further modified, such as is depicted in FIG. 7B. For example, once a user (e.g., 'User 2') has selected, viewed, etc., the content items (410A-C) depicted in FIG. 7A, additional content items (e.g., additional photos from the referenced vacation that are associated with 'User 1,' here, 410D-F, as depicted in FIG. 7B) can be provided in lieu of the previously presented content items (410A-C). For example, in a scenario in which numerous content items have been identified (e.g., as pertaining to the topic, etc., being discussed during a communication session), it may not be advantageous to provide/present all of such content items at once (on account of, for example, space limitations associated with the interface and/or so as not to distract the participants in the session with a large number of content items as once). Accordingly, while numerous content items may be identified (e.g., as stored on a social network) as being relevant/related to various aspects of the communication session, several of such identified content items can be presented at a time and, upon determining that various content items have already been viewed/interacted with, other content items from the identified content items can be provided (e.g., in lieu of those that have been determined to have been viewed/interacted with). In one aspect, block 340 is performed by content processing engine 130.

At block 350, one or more aspects of an interface of the communication session (e.g., a communication session, such as a chat session, a videoconference, etc., between a first user and a second user) can be modified. In certain implementations, such a communication session can be modified based on one or more content items (e.g., those content items identified at 320). For example, as depicted in FIG. 4A and described herein, an interface of a communication session between various users can be modified by incorporating various content items associated with one (or more) of the users and/or the content of the communication inputs provided by the user(s). Moreover, in certain implementations, various aspects of the interface of the communication session can be modified based on various contextual characteristics (such as those identified at 330, e.g., contextual characteristics associated with a first user). Examples of such contextual characteristics include, but are not limited to, location characteristics (e.g., the city/country that a user is currently present in), weather characteristics (e.g., the current weather in a location that a user is currently present in), time of day characteristics (e.g., whether it is morning, afternoon, evening, etc., in a location that a user is currently present in), and/or any other such characteristics that may reflect various aspects of the context in which a participant in the communication session is present. By way of illustration, as depicted in FIG. 5A and described herein, the referenced interface can be modified to incorporate tall buildings/a skyline of a city at which a user is present, as well as a cloud/rain graphic, depicting that it is currently raining in the referenced location, thereby reflecting various contextual characteristics (e.g., location and weather) associated with a participant in the communication session. In one aspect, block 350 is performed by content processing engine 130.

Figure 5B:
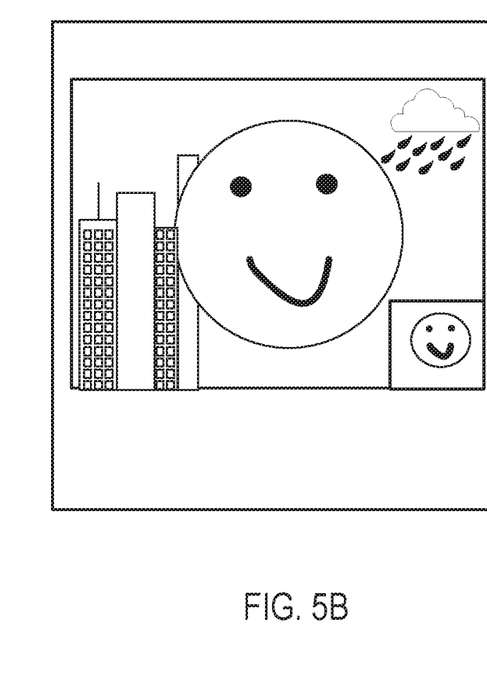
FIG. 5B depicts an exemplary communication session interface, in accordance with one implementation of the present disclosure.

By way of further example, in certain implementations various aspects of the communication input associated with a first user (e.g., the communication input originating from a first user as received at 310) as presented in the interface of the communication session can be modified based on the one or more contextual characteristics associated with the first user (such as those identified at 330, e.g., contextual characteristics associated with a first user). For example, FIG. 5B depicts an exemplary interface of a videoconferencing service/application. As shown in FIG. 5B and described herein, various aspects of the communication input (e.g., the video stream provided by one or more of the participants in the videoconference) can be modified based on the referenced contextual characteristics (e.g., location, weather, etc.). For example, as shown in FIG. 5B, tall buildings/a skyline of a city at which a user is present can be incorporated into the video itself (e.g., by overlaying such graphics/content in relation to the video, utilizing 'green screen' techniques to present such graphics/content in areas of the video that are otherwise blank, etc.), as well as a cloud/rain graphic, depicting that it is currently raining in the referenced location.

By way of yet further example, various content items, such as those associated with a first user and a second user can be presented within an interface of the communication session. For example, as depicted in FIG. 4B and described herein, an interface of a communication session between various users can be modified by incorporating various content items 410 associated with two (or more) of the users and/or the content of the communication inputs provided by the user(s) (e.g., photos from a trip that both of the users participated in).

Figure 6A:
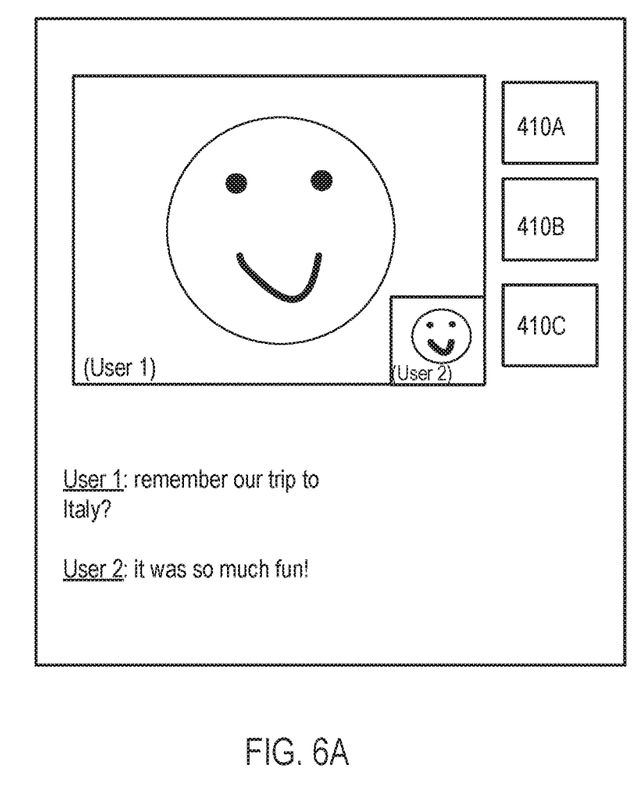
FIG. 6A depicts an exemplary communication session interface, in accordance with one implementation of the present disclosure.
Figure 6B:
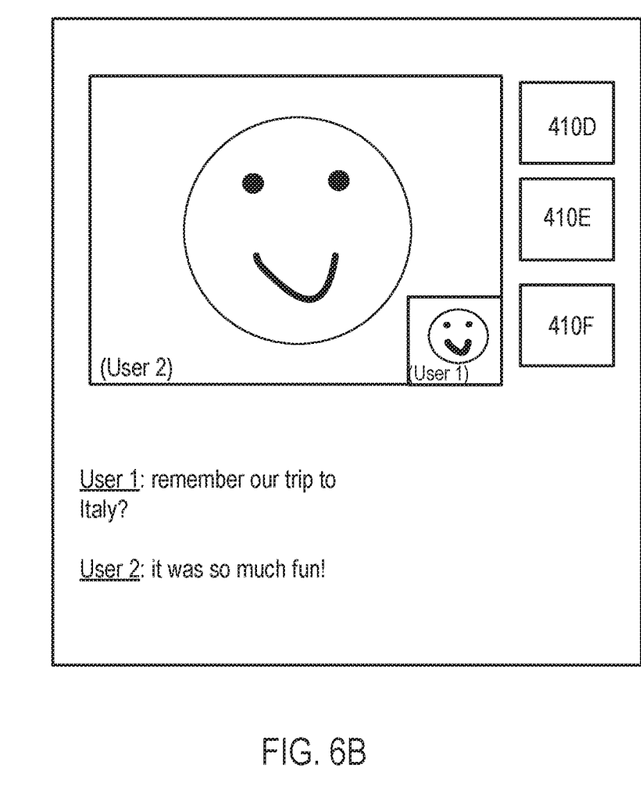
FIG. 6B depicts an exemplary communication session interface, in accordance with one implementation of the present disclosure.

Moreover, in certain implementations various aspects of an interface of the communication session as presented to a second user (e.g., the user to whom the communication input received at 310 is directed) can be modified, based on various content items (e.g., those content items identified at 320). By way of illustration, FIGS. 6A and 6B depict respective exemplary interfaces of a videoconferencing service/application as presented to respective participants in a communication session ('User 1' and 'User 2'). FIG. 6A depicts an interface of the communication session as presented to 'User 2.' As depicted in FIG. 6A and described herein, various content items (410A-C), such as those associated with another participant in the communication session (here, 'User 1') and also associated with communication input(s) provided during such a session (e.g., audio and/or text such as 'remember our trip to Italy?') can be identified. For example, as shown in FIG. 6A, content items 410A-C (which can be stored at content sharing platform 140, e.g., a social networking site/service) can be identified based on their association with another participant in the communication session (e.g., 'User 1') as well based on their association with/relevance to the content of various communication inputs provided by the user(s), and such identified content items can be presented within the interface of the communication session as presented to 'User 2.' Thus, for example, as depicted in FIG. 6A, 'User 2' can be presented with content items 410A-C (e.g., photos associated with 'User 1' that pertain to the referenced trip to Italy). Moreover, as shown in FIG. 6B (depicting an exemplary interface of the same communication session as shown to 'User 1'), the other participant(s) in the communication session (here, 'User 1') can be presented with other content items. For example, 'User 1' can be presented with content items 410D-F (e.g., photos associated with 'User 2' that pertain to the referenced trip to Italy). In doing so, various participants in the communication session can be presented with different content items that may pertain to the same or similar communication input(s) (e.g., the referenced 'trip to Italy') but which are associated with (e.g., were captured by) different users. As a result, each participant in the communication session can be provided with/exposed to content items that may be of interest/relevance to the topic being discussed but which the participant to whom such content is presented may not previously have been aware of (e.g., by virtue of the fact that such content items are associated with another user).

Additionally, in certain implementations, various aspects of the interface of the communication session as presented to the first user (e.g., the user with respect to which the communication input received at 310 originates) can be modified based on an interaction (e.g., an interaction associated with a second user, such as is received at 340). For example, as described herein, FIG. 7A depicts an exemplary interface within which various content items 410A-C (e.g., content items identified as pertaining to a communication input provided during the communication session and a participant in the communication session) are presented. Upon receiving interaction(s) in relation to the referenced interface (reflecting, for example, that 'User 2' has selected, viewed, etc., content items 410A-C), additional content items (e.g., additional photos from the referenced vacation that are associated with 'User 1,' here, 410D-F) can be provided in lieu of the previously presented content items (410A-C), such as is depicted in FIG. 7B. In doing so, content that is relevant to the substance of the communication session as well as a participant in the session (e.g., 'User 1') can be incorporated within the interface, such as in order to provide additional context to other participant(s) in the session (e.g., 'User 2'). However, once such participant(s) have interacted with/viewed the initially presented content, additional content can be substituted/incorporated.

In certain implementations, various content items (e.g., those content items identified at 320) can be provided as a background to the communication input (e.g., the communication input received at 310) as presented within the interface. Additionally, in certain implementations a link to various content items (e.g., those content items identified at 320) can be provided in relation to the communication input (e.g., the communication input received at 310) as presented within the interface.

Figure 8A:
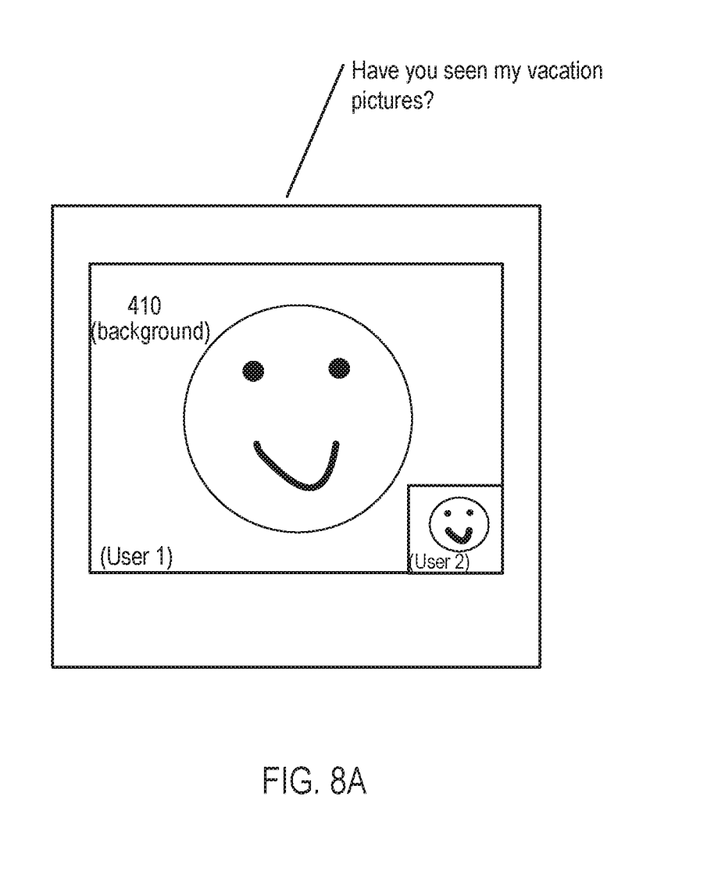
FIG. 8A depicts an exemplary communication session interface, in accordance with one implementation of the present disclosure.
Figure 8B:
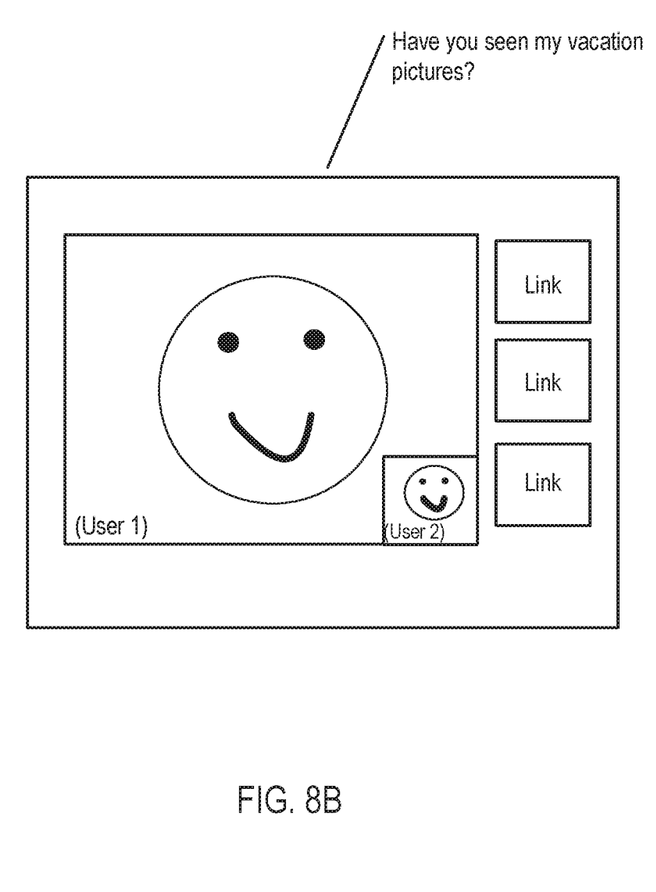
FIG. 8B depicts an exemplary communication session interface, in accordance with one implementation of the present disclosure.

By way of illustration, FIG. 8A depicts an exemplary interface of a videoconferencing service/application. As shown in FIG. 8A and described herein, various aspects of the communication input (e.g., the video stream provided by one or more of the participants in the videoconference) can be modified based on various content items (e.g., those content items identified at 320). For example, as shown in FIG. 8A, one or more content items 410 (which can be stored at content sharing platform 140, e.g., a social networking site/service, such as in relation to an account associated with the user) can be incorporated into the communication session (e.g., in relation to the user to whom they pertain, e.g., 'User 1'). In certain implementations, such content items can be presented as a background during the session, such as by utilizing 'green screen' techniques (which may, for example enable sections of an image or video to be identified and substituted with other content) to present such graphics/content in areas of the video that are otherwise blank, etc. Additionally, as depicted in FIG. 8B and described herein, in certain implementations one or more links to various content items (e.g., those content items identified at 320) can be provided. Upon selecting such links, the user can access/view the referenced content items (e.g., within another interface, application, etc.).

It should also be noted that while the technologies described herein are illustrated primarily with respect to incorporating user content within a communication session interface, the described technologies can also be implemented in any number of additional or alternative settings or contexts and towards any number of additional objectives.

Figure 9:
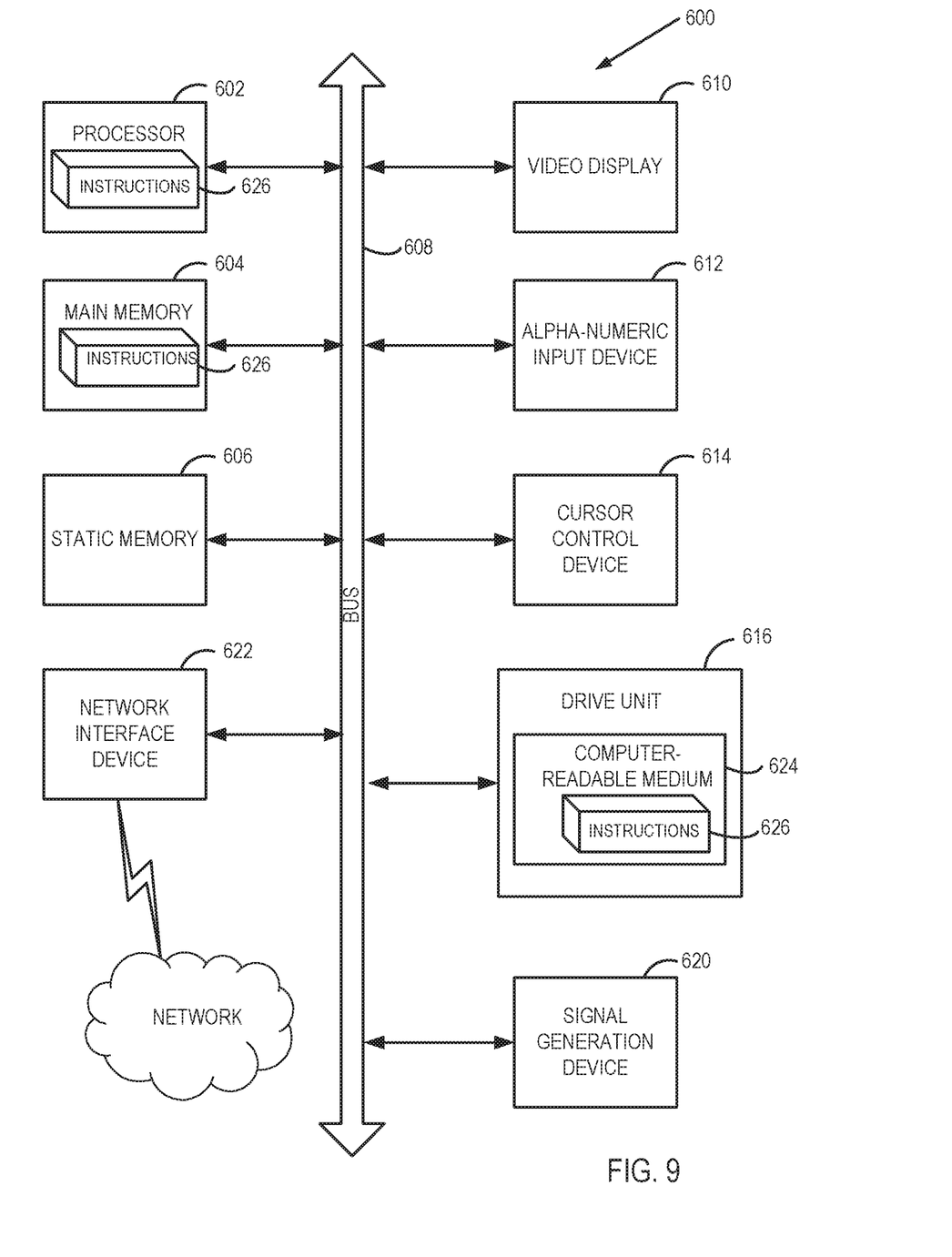
FIG. 9 depicts a block diagram of an illustrative computer system operating in accordance with aspects and implementations of the present disclosure.

FIG. 9 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a non-transitory computer-readable medium 624 on which is stored one or more sets of instructions 626 embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "processing," "modifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could also be applied to other types of data instead of, or in addition to, those described and/or referenced herein. The scope of the disclosure should, therefore, be determined with reference to the appended claims, along with the full scope of equivalents to which such claims are entitled.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

What is claimed is:

1. A method comprising:
    receiving, during a communication session between a first user and a second user, a communication input associated with the first user, wherein the communication input is originated from the first user and directed to the second user;
    identifying, based on content of the communication input received during the communication session between the first user and the second user and an account of the first user on a content sharing platform, a plurality of content items that are relevant to the content of the communication input, wherein the plurality of content items are stored on the content sharing platform and that are in the account of the first user;
    identifying, by a processing device, a first content item of the plurality of content items that is associated with the first user and a second content item of the plurality of content items that is associated with the second user;
    modifying one or more aspects of a first interface of the communication session to present the second content item to the first user; and
    modifying one or more aspects of a second interface of the communication session to present the first content item to the second user.

2. The method of claim 1, wherein identifying, based on the content of the communication input received during the communication session and the account of the first user on the content sharing platform, the plurality of content items comprises:
    identifying the plurality of content items based on relevance of the plurality of content items to the content of the communication input.

3. The method of claim 1, wherein the one or more aspects of the first interface of the communication session are modified based on one or more contextual characteristics associated with the first user.

4. The method of claim 1, further comprising:
    receiving an interaction with the second interface of the communication session by the second user; and
    in view of the interaction, modifying the first interface of the communication session to present a third content item of the plurality of content items.

5. The method of claim 1, wherein modifying the one or more aspects of the second interface of the communication session further comprises providing the first content item as a background within the second interface of the communication session.

6. The method of claim 1, wherein modifying the one or more aspects of the first interface of the communication session comprises providing a link to the second content item in relation to the communication input as presented within the first interface.

7. The method of claim 1, wherein the communication input comprises at least one of textual content, video content, or graphical content.

8. A system comprising:
    a memory; and
    a processing device, operatively coupled to the memory, to:
        receive, during a communication session between a first user and a second user, a communication input associated with the first user, wherein the communication input is originated from the first user and directed to the second user;
        identify, based on content of the communication input received during the communication session between the first user and the second user and an account of the first user on a content sharing platform, a plurality of content items that are relevant to the content of the communication input, wherein the plurality of content items are stored on the content sharing platform and that are in the account of the first user;
        identify a first content item of the plurality of content items that is associated with the first user and a second content item of the plurality of content items that is associated with the second user;
        modify one or more aspects of a first interface of the communication session to present the second content item to the first user; and
        modify one or more aspects of a second interface of the communication session to present the first content item to the second user.

9. The system of claim 8, wherein to identify, based on the content of the communication input received during the communication session and the account of the first user on the content sharing platform, the plurality of content items, the processing device is further to:
    identify the plurality of content items based on relevance of the plurality of content items to the content of the communication input.

10. The system of claim 8, wherein the one or more aspects of the first interface of the communication session are modified based on one or more contextual characteristics associated with the first user.

11. The system of claim 8, wherein the processing device is further to:
    receive an interaction with the second interface of the communication session by the second user; and
    in view of the interaction, modify the first interface of the communication session to present a third content item of the plurality of content items.

12. The system of claim 8, wherein, to modify the one or more aspects of the second interface of the communication session, the processing device is further to provide the first content item as a background within the second interface of the communication session.

13. The system of claim 8, wherein, to modify the one or more aspects of the first interface of the communication session, the processing device is further to provide a link to the second content item in relation to the communication input as presented within the first interface.

14. A non-transitory computer readable medium having instructions stored thereon that, when executed by a processing device, cause the processing device to:
    receive, during a communication session between a first user and a second user, a communication input associated with the first user, wherein the communication input is originated from the first user and directed to the second user;
    identify, based on content of the communication input received during the communication session between the first user and the second user and an account of the first user on a content sharing platform, a plurality of content items that are relevant to the content of the communication input, wherein the plurality of content items are stored on the content sharing platform and that are in the account of the first user;
    identify a first content item of the plurality of content items that is associated with the first user and a second content item of the plurality of content items that is associated with the second user;

modify one or more aspects of a first interface of the communication session to present the second content item to the first user; and modify one or more aspects of a second interface of the communication session to present the first content item to the second user.

15. The non-transitory computer readable medium of claim 14, wherein to identify, based on the content of the communication input received during the communication session and the account of the first user on the content sharing platform, the plurality of content items, the processing device is further to:

identify the plurality of content items based on relevance of the plurality of content items to the content of the communication input.

16. The non-transitory computer readable medium of claim 14, wherein the one or more aspects of the first interface of the communication session are modified based on one or more contextual characteristics associated with the first user.

17. The non-transitory computer readable medium of claim 14, wherein the processing device is further to:

receive an interaction with the second interface of the communication session by the second user; and in view of the interaction, modify the first interface of the communication session to present a third content item of the plurality of content items.

18. The non-transitory computer readable medium of claim 14, wherein, to modify the one or more aspects of the second interface of the communication session, the processing device is further to provide the first content item as a background within the second interface of the communication session.

19. The non-transitory computer readable medium of claim 14, wherein, to modify the one or more aspects of the first interface of the communication session, the processing device is further to provide a link to the second content item in relation to the communication input as presented within the first interface.

20. The non-transitory computer readable medium of claim 14, wherein the communication input comprises at least one of textual content, video content, or graphical content.

* * * * *